United States Patent [19]

Higuchi et al.

[11] Patent Number: 5,041,904

[45] Date of Patent: Aug. 20, 1991

[54] VIDEO SIGNAL PROCESSING CIRCUIT

[75] Inventors: Shigemitsu Higuchi, Fujisawa; Hisanobu Tsukazaki, Yokohama; Motohiro Sasaki, Kamakura, all of Japan

[73] Assignees: Hitachi, Ltd., Tokyo; Hitachi Video Engineering, Inc., Yokohama, both of Japan

[21] Appl. No.: 327,594

[22] Filed: Mar. 23, 1989

[30] Foreign Application Priority Data

Mar. 31, 1988 [JP] Japan .................................. 63-76506

[51] Int. Cl.⁵ .............................................. H04N 11/20
[52] U.S. Cl. ....................................... 358/11; 358/313
[58] Field of Search ............................ 358/11, 31, 313

[56] References Cited

U.S. PATENT DOCUMENTS

| 4,214,263 | 7/1980 | Kaiser | 358/22 |
| 4,241,363 | 12/1980 | Maeyami | 358/36 |
| 4,456,922 | 6/1984 | Balaban et al. | 358/31 |
| 4,641,202 | 2/1987 | Nakamura et al. | 358/313 |
| 4,809,060 | 2/1989 | Saeki | 358/31 |

FOREIGN PATENT DOCUMENTS

| 143887 | 11/1980 | Japan | 358/31 |
| 150687 | 11/1980 | Japan | 358/31 |
| 150688 | 11/1980 | Japan | 358/31 |
| 164690 | 12/1981 | Japan | 358/11 |
| 115995 | 7/1983 | Japan | 358/31 |
| 77782 | 5/1984 | Japan | 358/31 |
| 158187 | 9/1984 | Japan | 358/31 |

Primary Examiner—John W. Shepperd
Attorney, Agent, or Firm—Antonelli, Terry, Stout & Kraus

[57] ABSTRACT

In a digital video signal processing circuit where digital composite video signals are inputted and processed in separation into a luminance signal and a chrominance signal, the digital video signal processing circuit is provided with a device for separating a first frequency component including a luminance signal in a relatively low region from the digital composite video signals, a device for separating a second frequency component including a luminance signal in the vicinity of a color subcarrier and a chrominance signal, a line comb-shaped filter for separating the second frequency component into the luminance signal in the vicinity of the color subcarrier and the chrominance signal, an adding device for adding the first frequency component and the luminance signal in the vicinity of the color subcarrier, a phase inversion device for inverting the phase of the chrominance signal, and an adding device for adding the chrominance signal in phase inversion to the first frequency component or the luminance signal in the vicinity of the color subcarrier, so that the picture quality of the reproduction image can be improved.

3 Claims, 6 Drawing Sheets

VIDEO SIGNAL PROCESSING CIRCUIT

BACKGROUND OF THE INVENTION

The present invention relates to video signal processing circuits, and more particularly, to a digital video signal processing circuit which outputs a static image with little image deterioration in a magnetic recording and reproducing apparatus to record and reproduce video signals in composite digital signal form.

In a magnetic recording and reproducing apparatus (video tape recorder, hereinafter referred to as "VTR"), not only reproduction of recorded video signals at ordinary speed but also the function of special reproduction such as static image reproduction or slow motion reproduction are required.

In such video devices for adopting color television system of NTSC, it is preferable always to satisfy the provisional standard RS-170A (present standard of NTSC system) of the EIA (Electronic Inductry Association). For example, when such a video device records video signal in composite signal form and a field static image is outputted, video signal processing is necessary which produces and outputs an image of four sheets of fields corresponding to the NTSC television system from an image of one sheet of a field by the so-called chroma invert technology of reading the record signal and inverting only the chrominance signal among a luminance signal (Y signal) and a chrominance signal (C signal). Such chroma invert technology is disclosed, for example, in U.S. Pat. No. 4,528,598.

In the prior art as above described, when the chrominance signal in a chroma invert circuit is inverted, the phase of the luminance signal with a frequency in the vicinity of color subcarrier ($f_{sc}$=3.58 MHz) is also inverted.

Consequently, at the chroma invert state, the wave form of a luminance signal is not held due to the phase inversion of a high region component among the luminance signal, and deterioration of the horizontal resolving power of the reproduction image or deterioration of the edge portion is generated.

When image corresponding to two continuous fields recorded in the signal processing circuit is inputted and a so-called frame static image is outputted, flicker is produced at the motion portion of the image and the picture quality is deteriorated.

SUMMARY OF THE INVENTION

An object of the invention is to provide a video signal processing circuit wherein deterioration of the horizontal resolution power caused by chroma invert or deterioration of the picture quality in the edge portion due to flicker is not produced.

Another object of the invention is to provide a frame static video signal processing circuit utilizing the above-mentioned video signal processing circuit, wherein flicker is not produced even at the motion portion.

In the invention, a chrominance signal only is taken out without including a luminance signal from color video signals including the luminance signal and the chrominance signal, and the taken chrominance signal is subjected to the invert processing. Since luminance signal at high region is not subjected to the invert processing, deterioration of the horizontal resolving power or deterioration of the edge portion is not produced.

Also, in the invention, the above-mentioned signal processing circuit of two systems is provided, and the above-mentioned processing is performed on the inputted video signals of two fields respectively, and further means for averaging outputs of the two systems is provided so that the motion portion is also averaged and flicker caused by the motion is prevented from being generated.

DESCRIPTION OF THE PREFERRED EMBODIMENTS

Embodiments of the invention will now be described referring to the accompanying drawings.

Figure 1:
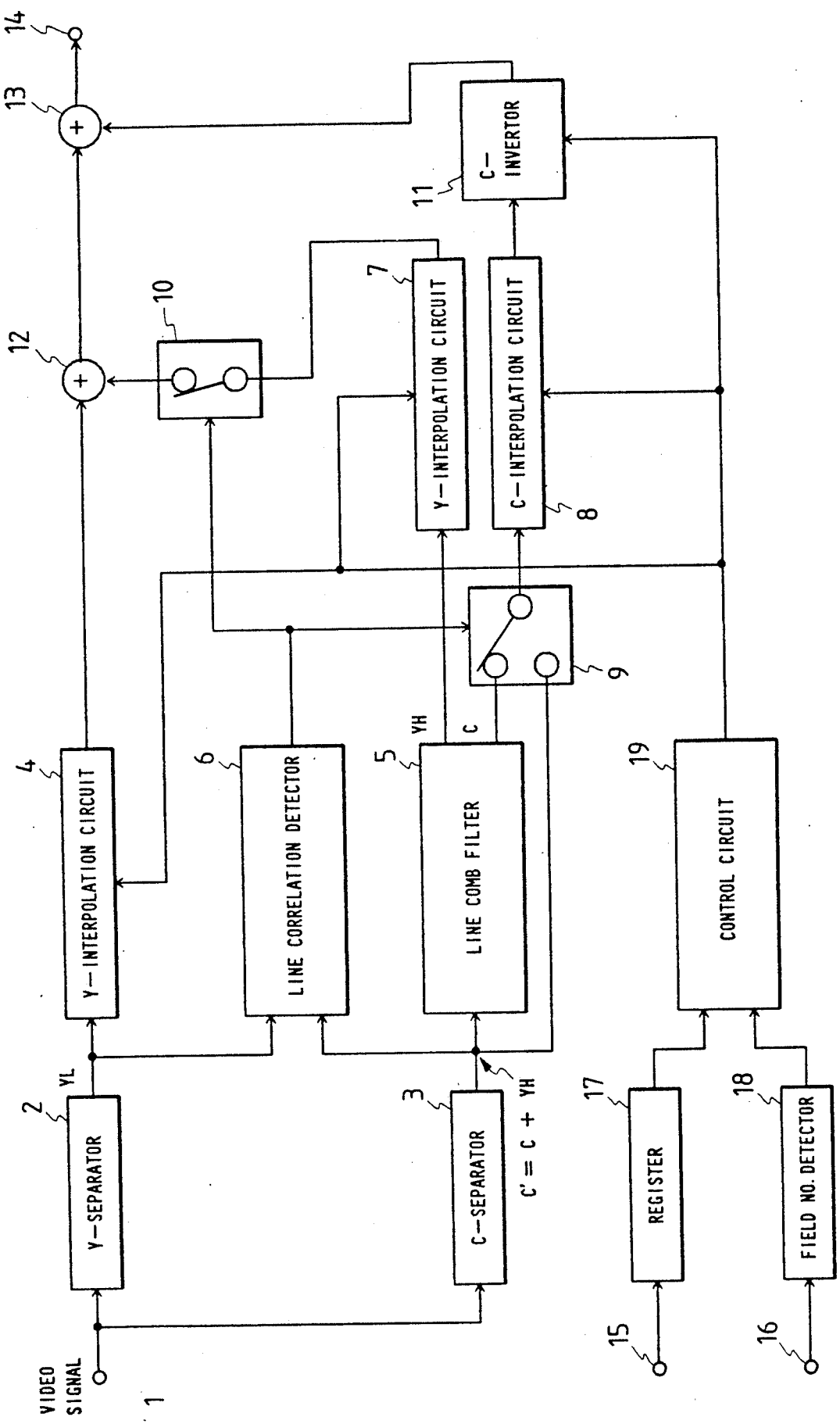
FIG. 1 is a block diagram of an embodiment of the invention.

FIG. 1 is a block diagram of a video signal processing circuit as an embodiment of the invention. In FIG. 1, numeral 1 designates an input terminal of a video signal, numeral 2 designates a luminance signal separation circuit (hereinafter referred to as "Y separation circuit "), numeral 3 designates a chrominance signal separation circuit (hereinafter referred to as "C separation circuit "), numerals 4 and 7 designate luminance signal interpolation circuits (hereinafter referred to as "Y interpolation circuit"), numeral 5 designates a line comb-shaped filter, numeral 8 designates a chrominance signal interpolation circuit (hereinafter referred to as "C interpolation circuit"), numerals 9, 10 designate switches, numeral 11 designates a chrominance signal inverter (hereinafter referred to as "chroma inverter"), numerals 12, 13 designate adders, numeral 14 designates an output terminal of video signal, numeral 15 designates a field information input terminal, numeral 16 designates a reference video signal input terminal, numeral 17 designates a register, numeral 18 designates a field detection circuit, and numeral 19 designates a control circuit.

In the embodiment shown in FIG. 1, a video signal is quantized by a subcarrier frequency of four times (4 $f_{sc}$=14.32 MHz) and thereby a digital video signal is inputted to the input terminal 1. In the video signal inputted to the input terminal 1, only a low region component $Y_L$ among a luminance signal is outputted by a Y separation circuit shown in FIG. 2.

Figure 2:
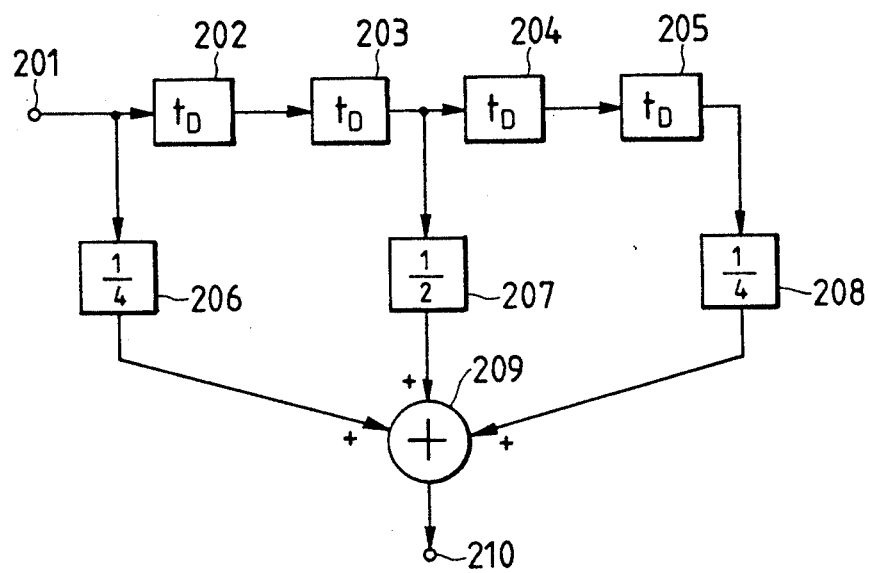
FIG. 2 is a block diagram of a luminance signal separation circuit.

FIG. 2 is a block diagram illustrating an example of a Y separation circuit (filter). In FIG. 2, numeral 201 designates an input terminal, numerals 202, 203, 204, 205 designate delay circuits, numerals 206, 207, 208 designate multipliers, numeral 209 designates an adder, and numeral 210 designates an output terminal.

In FIG. 2, an input video signal is inputted to the input terminal 201 and delayed in the delay circuits 202-205 respectively by $t_D$, and multiplied in the multipliers 206-208 by respective coefficients ($\frac{1}{4}$ in 206, 208, and $\frac{1}{2}$ in 207), and further added in the adder 209 and outputted to the output terminal 210.

In this case, if $t_D$ is selected to be $$t_D = \frac{1}{2} f_{sc} \quad \ldots (1)$$

the gain $K_Y$ of the Y separation circuit in FIG. 2 becomes $$K_Y = \frac{1}{2}\left(1 + \cos \pi \frac{f}{f_{sc}}\right) \quad (2)$$

(That is, it becomes characteristic of a comb-shaped filter where the zero point appears at $f_{sc}$, $3f_{sc}$, $5f_{sc}$...). Consequently, the gain becomes zero at $f=f_{sc}$, and the luminance signal $Y_L$ is separated.

On the other hand, chrominance signal $C'$ including high region luminance signal $Y_H$ is separated by the C separation circuit 3 from the video signal inputted to the input terminal 1.

Figure 3:
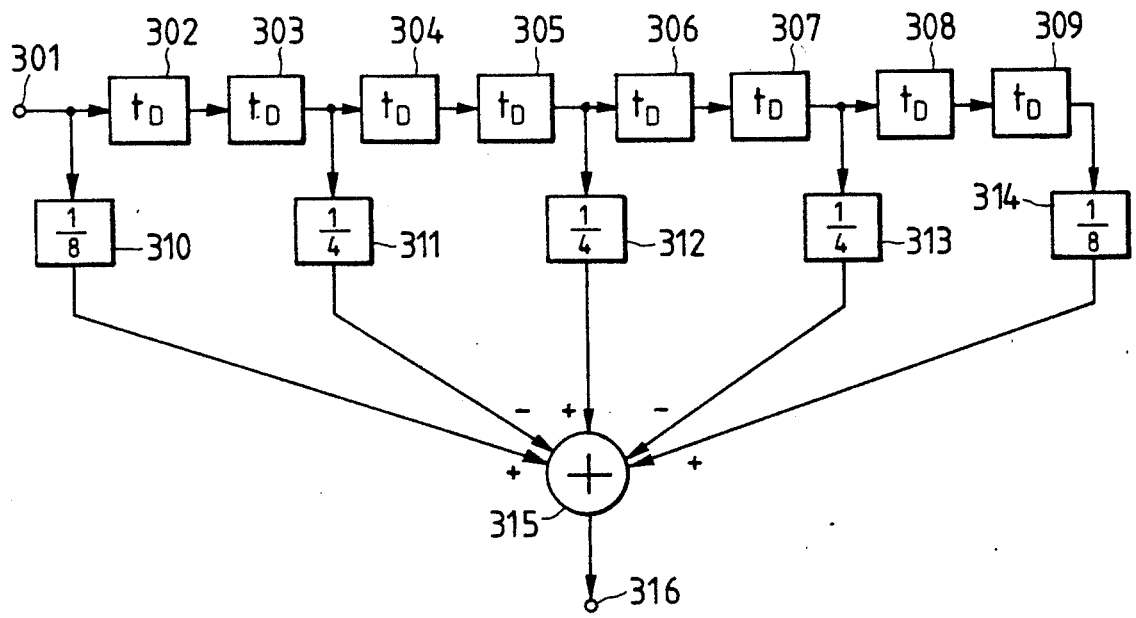
FIG. 3 is a block diagram of a chrominance signal separation circuit.

FIG. 3 is a block diagram illustrating an example of a C separation circuit (filter). In FIG. 3, numeral 301 designates an input terminal, numerals 302-309 designate delay circuits, numerals 310-314 designate multipliers, numeral 315 designates an adder, and numeral 316 designates an output terminal.

In this case, if $t_D$ is selected to be $$t_D = \frac{1}{2} f_{sc} \quad \ldots (3)$$

and coefficients are determined as shown in FIG. 3, the gain $K_c$ becomes $$K_c = \frac{1}{4}\left(1 - 2\cos \pi \cdot \frac{f}{f_{sc}} + \cos 2\pi \frac{f}{f_{sc}}\right) \quad (4)$$

(That is, it becomes characteristic of a comb-shaped filter where the zero point appears at 0, $2f_{sc}$, $4f_{sc}$...). In this characteristic, the gain becomes zero if $f=0$ and becomes 1 in $f=f_{sc}$. It becomes characteristic of a filter to pass only in the vicinity of $f_{sc}$, and the chrominance signal C and the luminance signal $Y_H$ in the vicinity thereof are outputted to the output terminal 301. Thus, the input video signal is separated into the low region luminance signal $Y_L$ and the composite signal $C' = (C + Y_H)$ of the high region luminance signal $Y_H$ and the chrominance signal C by the Y separation circuit 2 and the C separation circuit 3. This state is explained by FIG. 4.

Figure 4A:
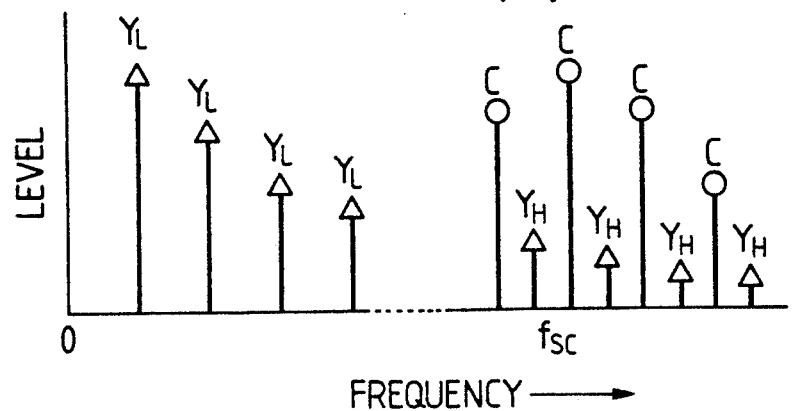
FIG. 4 is a diagram illustrating a spectrum of a video signal.
Figure 4B:
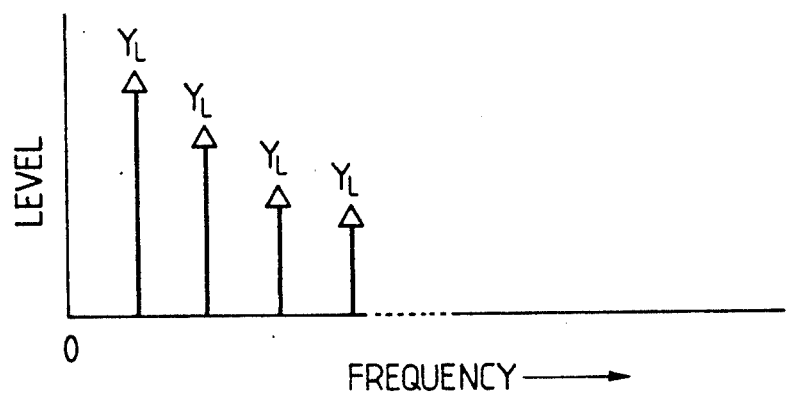
Figure 4C:
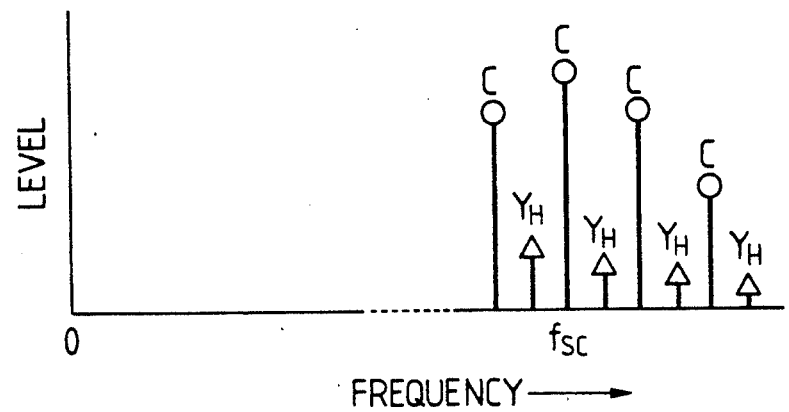

FIG. 4 is an explanation diagram of spectrum of the video signal. FIG. 4(a) shows a spectrum of the video signal and FIGS. 4(b) and 4(c) show a spectrum of the Y signal and the C signal separated by the Y separation circuit 2 and the C separation circuit 3, respectively.

The line comb-shaped filter 5 is used to separate the C signal and the $Y_H$ signal from the $(C+Y_H)$ signal.

Figure 5:
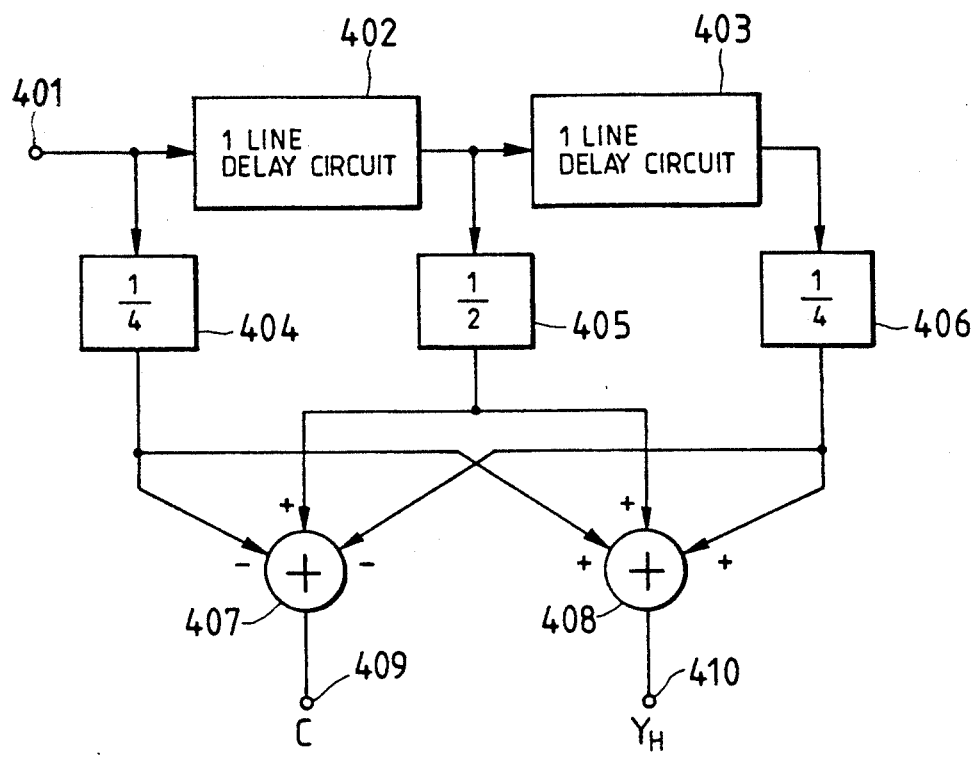
FIG. 5 is a block diagram illustrating a specific constitution of a line comb-shaped filter.

FIG. 5 is a block diagram illustrating a specific constitution of a line comb-shaped filter. In FIG. 5, numeral 401 designates an input terminal, numerals 402, 403 designate one-line delay circuits (delay of 910 samples in the 4 $f_{sc}$ sampling state), numerals 404, 405, 406 designate multipliers, numerals 407, 408 designate adders, and numerals 409, 410 designate output terminals.

In FIG. 5, video a signal inputted to the input terminal 401 is delayed in the delay circuits 402, 403, and multiplied in the multipliers 404, 405 by coefficients shown in FIG. 5 and added in the adders 407, 408, and thereby the gain $K'c$ to the output terminal 409 becomes $$K'c = \frac{1}{2}\left(1 - \cos \pi \frac{f}{f_H}\right) \quad (5)$$

and the chrominance signal C only is outputted to the output terminal 409.

On the other hand, the gain $K_H$ to the output terminal 410 becomes $$K_H = \frac{1}{2}\left(1 + \cos \pi \frac{f}{f_H}\right) \quad (6)$$

and the high region luminance signal $Y_H$ only is outputted to the output terminal 410, wherein $f_H$ is horizontal synchronous frequency.

$Y_L$, $Y_H$ and C separated in this manner are subsequently inputted to the interpolation circuits 4, 7, 8 respectively, and scan line interpolation is performed if necessary and deterioration of the vertical resolving power at the field static picture output state is prevented. Next, the low region luminance signal $Y_L$ in the output of the Y interpolation circuit 4 and the high region luminance signal $Y_H$ in the output of the Y interpolation circuit 7 are added in the adder 12, and further C in the output of the C interpolation circuit 8 is inverted (phase inversion) if necessary and added in the adder 13 and outputted as output signal to the output terminal 14.

According to this constitution, since only phase inversion of the chrominance signal C is performed and the luminance signal from the low region ($Y_L$) to the high region ($Y_H$) is outputted as is, deterioration of the horizontal resolving power is not produced. Further, deterioration of the vertical resolving power is suppressed to a minimum by the scan line interpolation circuits 4, 7, 8.

The line correlation detection circuit 6 and the switches 9, 10 inhibit separation of the high region luminance signal $Y_H$ and the chrominance signal C by the line comb-shaped filter 5 when there is little correlation of image between the upper and lower lines. In this case, the output of the Y interpolation circuit 4 and the output of the C separation circuit 3 are subjected to scan line interpolation by the C interpolation circuit 8, and phase inversion is performed in the chroma inverter 11 if necessary and the sum of outputs of both circuits is outputted. Deterioration of the picture quality such as deterioration of the edge in the vertical direction due to the interline processing is prevented in the image with little correlation between the upper and lower lines.

Figure 6:
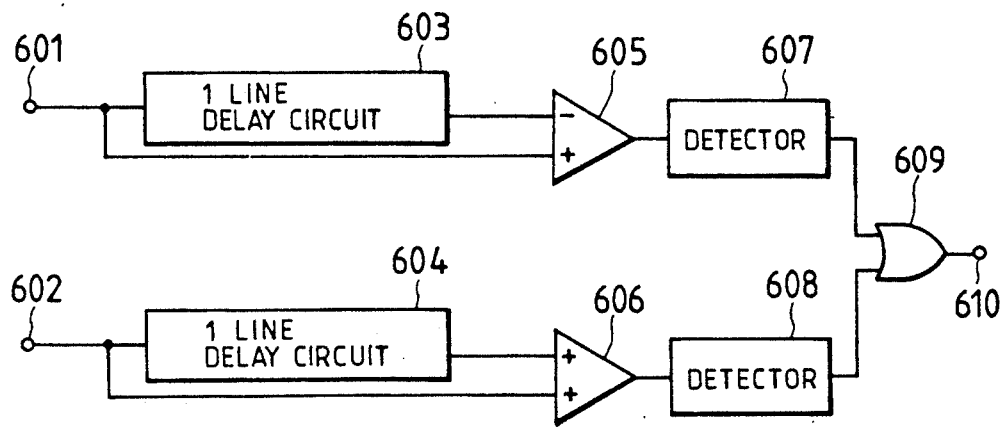
FIG. 6 is a block diagram illustrating a specific constitution of a line correlation detection circuit.

FIG. 6 is a block diagram illustrating a specific constitution of a line correlation detection circuit. In FIG. 6, numerals 601, 602 designate input terminals, numerals 603, 604 designate one-line delay circuits, numerals 605, 606 designate arithmetic circuits, numerals 607, 608 designate decision circuits, numeral 609 designates an OR circuit, and numeral 610 designates an output terminal.

In FIG. 6, correlation between lines of $Y_L$ signal and $(C+Y_H)$ signal inputted to the input terminals 601 and 602, respectively, is determined by the decision circuits 607 and 608 in that level difference of respective signals between lines is estimated by the one-line delay circuits 603, 604 and the arithmetic circuits 605, 606. If the absolute value output of the arithmetic circuit 605 or 606 is larger than the set value, respectively, the decision circuits 607 and 608 determine that the correlation is little. If the correlation is little, "1" is outputted to the output circuit. In this case, the switch 10 is turned off, and the switch 9 is changed so that the output of the C separation circuit 3 is connected directly to the C interpolation circuit 8. In addition, the correlation detection may be effected by $Y_L$ signal only or by C' signal only.

Next, the control circuit 19 will be described.

According to field information of processing signal inputted to the input terminal 15 and stored in the register 17 (information indicating which field among fields I-IV shown in the RS-170A is the video signal inputted to the input terminal 1 and being obtained by detection of the parity of the field of the video signal supplied to the terminal 1 and the phase of the chrominance signal) and display field information inputted to the input terminal 16 (information being auxiliary data recorded in digital form by an ordinary tape and being detected by the field detection circuit 18 from the reference video signal inputted to the input terminal 16, i.e., information indicating which field signal should be outputted to the output terminal 14), the control circuit 19 determines how the interpolation circuits 4, 7, 8 and the chroma inverter 11 should be controlled. This will be described concretely afterward.

The above-mentioned processing will be described further in detail using numerical expressions.

Figure 7:
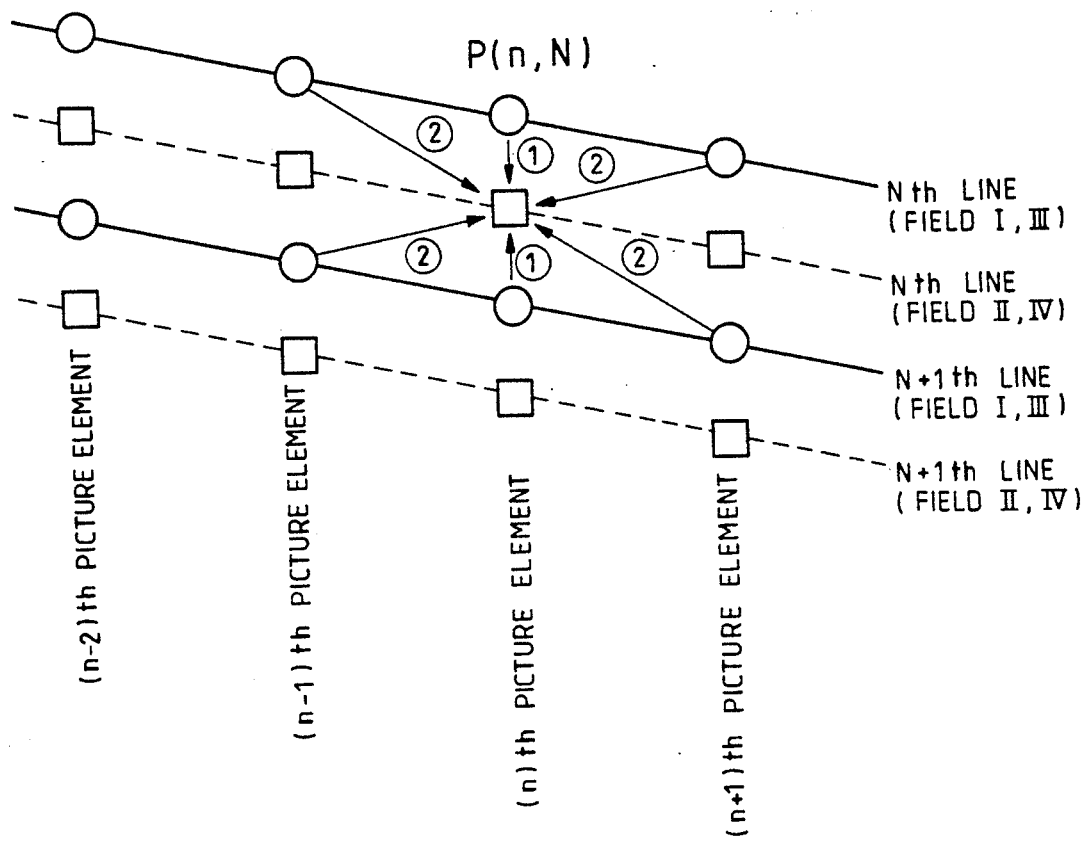
FIG. 7 is a concept diagram of a television signal explaining operation of the embodiment in FIG. 1.

FIG. 7 is a concept diagram of television signal explaining operation of the embodiment in FIG. 1.

In FIG. 7, if a signal of an n-th picture in an N-th line of the NTSC composite signal in input and output is represented by P(n,N), as shown in the RS - 170A, the position relation to the field I, III and the field II, IV becomes as shown in the figure.

First, in the Y separation circuit 2, the low region luminance signal $Y_{L(n,N)}$ is separated in accordance with following expression.

$$Y_{L(n,N)} = \tfrac{1}{4} P_{(n-2,N)} + \tfrac{1}{2} P_{(n,N)} + \tfrac{1}{4} P_{(n+2,N)} \quad (7)$$

Next, in the C separation circuit 3, the composite signal $C'_{(n,N)}$ of the high region luminance signal $Y_{H(n,N)}$ and the chrominance signal $C_{(n,N)}$ is separated in accordance with following expression.

$$C'_{(n,N)} = \tfrac{1}{8} P_{(n-4,N)} - \tfrac{1}{4} P_{(n+2,N)} + \tfrac{1}{8} P_{(n+4,N)} \quad (8)$$

Further in the line comb-shaped filter 5, the high region luminance signal $Y_H$ and the chrominance signal $C$ are separated in accordance with following expressions respectively.

$$Y_H = \tfrac{1}{4} C'_{(n,N-1)} + \tfrac{1}{2} C'_{(n,N)} + \tfrac{1}{4} C'_{(n,N+1)} \quad (9)$$

$$C_{(n,N)} = -\tfrac{1}{4} C'_{(n,N-1)} + \tfrac{1}{2} C'_{(n,N)} - \tfrac{1}{4} C'_{(n,N+1)} \quad (10)$$

The Y interpolation circuits 4, 7 output the low region luminance signal $Y_L{}^*_{(n,N)}$ and the high region luminance signal $Y_H{}^*_{(n,N)}$ subjected to scan line interpolation in accordance with expressions shown in following table 1 respectively.

TABLE 1

| input field | output field | | | |
|---|---|---|---|---|
| | I | II | III | IV |
| I | $Y_1$ | $Y_2$ | $Y_1$ | $Y_2$ |
| II | $Y_3$ | $Y_1$ | $Y_3$ | $Y_1$ |
| III | $Y_1$ | $Y_2$ | $Y_1$ | $Y_2$ |
| IV | $Y_3$ | $Y_1$ | $Y_3$ | $Y_1$ |

$Y_1$: $Y_L{}^*_{(n,N)} = Y_{L(n,N)}$
  $Y_H{}^*_{(n,N)} = Y_{H(n,N)}$
$Y_2$: $Y_L{}^*_{(n,N)} = \tfrac{1}{2} Y_{L(n,N)} + \tfrac{1}{2} Y_{L(n,N+1)}$
  $Y_H{}^*_{(n,N)} = \tfrac{1}{2} Y_{H(n,N)} + \tfrac{1}{2} Y_{H(n,N+1)}$
$Y_3$: $Y_L{}^*_{(n,N)} = \tfrac{1}{2} Y_{L(n,N-1)} + \tfrac{1}{2} Y_{L(n,N)}$
  $Y_H{}^*_{(n,N)} = \tfrac{1}{2} Y_{H(n,N-1)} + \tfrac{1}{2} Y_{H(n,N)}$ The input field in table 1 is information of the register 17 and indicates the field number of the input video signal to the input terminal 1, and the output field is output information of the field detection circuit 18 and indicates the field number to be outputted in the present.

Table 2 shows the output $C^*_{(n,N)}$ of the C interpolation circuit 8 subjected to scan line interpolation.

TABLE 2

| input field | output field | | | |
|---|---|---|---|---|
| | I | II | III | IV |
| I | $C_1$ | $C_2$ | $C_1$ | $C_2$ |
| II | $C_3$ | $C_1$ | $C_3$ | $C_1$ |
| III | $C_1$ | $C_2$ | $C_1$ | $C_2$ |
| IV | $C_3$ | $C_1$ | $C_3$ | $C_1$ |

$C_1$: $C^*_{(n,N)} = C_{(n,N)}$
$C_2$: $C^*_{(n,N)} = \tfrac{1}{2} C_{(n,N)} - \tfrac{1}{2} C_{(n,N-1)}$
$C_3$: $C^*_{(n,N)} = -\tfrac{1}{2} C_{(n,N-1)} + \tfrac{1}{2} C_{(n,N)}$ Also table 3 shows the operation condition of the chroma inverter 11. In table 3, "+" indicates the non-inversion and "−" indicates the inversion.

TABLE 3

| input field | output field | | | |
|---|---|---|---|---|
| | I | II | III | IV |
| I | + | − | − | + |
| II | − | + | + | − |
| III | − | + | + | − |
| IV | + | − | − | + |

Thus the control circuit 19 outputs an instruction to control the interpolation circuits 4, 7, 8 and the chroma inverter 11 in accordance with tables 1-3 by the input field and the output field, and further the interpolation circuits 4, 7, 8 and the chroma inverter 11 perform the operation shown in the tables in accordance with the instruction.

Since these interpolation circuits can be easily constituted by the line delay circuit, the adder and the multiplier as above described, the concrete constitution method shall be omitted.

Some operation requires the delay circuit for the timing matching with the signal system, and the timing may be adjusted so that n and N of the output signal in each system become equal.

The interpolation may be performed not only in the direction 1 shown in FIG. 7 but also in combination of the direction 1 and the direction 2.

Next, another constitution example of the line comb-shaped filter 5 will be described.

Figure 8:
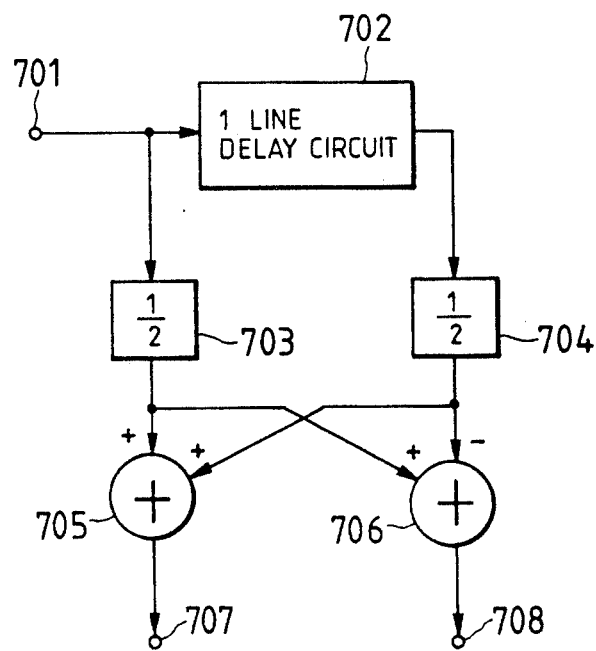
FIG. 8 is a block diagram illustrating another constitution example of a line comb-shaped filter.

FIG. 8 is a block diagram illustrating another constitution example of the line comb-shaped filter. In FIG. 8, numeral 701 designates an input terminal, numeral 702 designates a one-line delay circuit, numerals 703, 704 designate multipliers, numerals 705, 706 designate adders, and numerals 707, 708 designate output terminals.

In FIG. 8, if the C′ signal is supplied to the input terminal 701, the signal delayed by one line in the one-line delay circuit 702 and the input signal are added in the adders 705, 706 in coefficient ratio determined by the multipliers 703, 704. As a result, the high region luminance signal $Y_H$ only is outputted to the output terminal 707, and the chrominance signal C is outputted to the output terminal 708. The difference from the line comb-shaped filter of FIG. 5 is that the center of gravity of the separated signals $Y_H$ and C exists between the lines operated. Consequently, the interpolation method must be devised when the line comb-shaped filter processing in FIG. 8 is performed. The high region luminance signal $Y_H$ and the chrominance signal C can be represented by following expressions.

$$Y_H = \tfrac{1}{2} C'_{(n,N-1)} + \tfrac{1}{2} C_{(n,N)} \quad (11)$$

$$C = -\tfrac{1}{2} C_{(n,N-1)} + \tfrac{1}{2} C_{(n,N)} \quad (12)$$

Processing of the interpolation circuits 4, 7, 8 will now be described.

In the line comb-shaped processing of FIG. 8, since the separated signals $Y_H$ and C correspond to the position of another field as above described, the algorithm must be changed regarding the interpolation circuits 7, 8 of $Y_H$ and C. In table 1, $Y_1$, $Y_2$, $Y_3$ become as follows.

$Y_1$; $Y_L^*{}_{(n,N)} = Y_{L(n,N)}$ $Y_H^*{}_{(n,N)} = \tfrac{1}{2} Y_{H(n,N)} + \tfrac{1}{2} Y_{H(n,N+1)}$ $Y_2$; $Y_L^*{}_{(n,N)} = \tfrac{1}{2} Y_{L(n,N)} + \tfrac{1}{2} Y_{L(n,N+1)}$ $Y_H^* = Y_{H(n,N+1)}$ $Y_3$; $Y_L^*{}_{(n,N)} = \tfrac{1}{2} Y_{L(n,N-1)} + \tfrac{1}{2} Y_{L(n,N)}$ $Y_H^* = Y_{H(n,N)}$ Also in table 2, $C_1$, $C_2$, $C_3$ become as follows.

$C_1$; $C^*{}_{(n,N)} = \tfrac{1}{2} C_{(n,N)} - \tfrac{1}{2} C_{(n,N+1)}$ $C_2$; $C^*{}_{(n,N)} = -C_{(n,N+1)}$ $C_3$; $C^*{}_{(n,N)} = C_{(n,N)}$ Table 3 is not changed.

Although the scan line interpolation of the high region luminance signal $Y_H$ and the chrominance signal C is performed in the above-mentioned embodiment, if slight deterioration of the picture quality is allowed, the high region luminance signal interpolation circuit 7 and the chrominance signal interpolation circuit 8 may be omitted.

Figure 9:
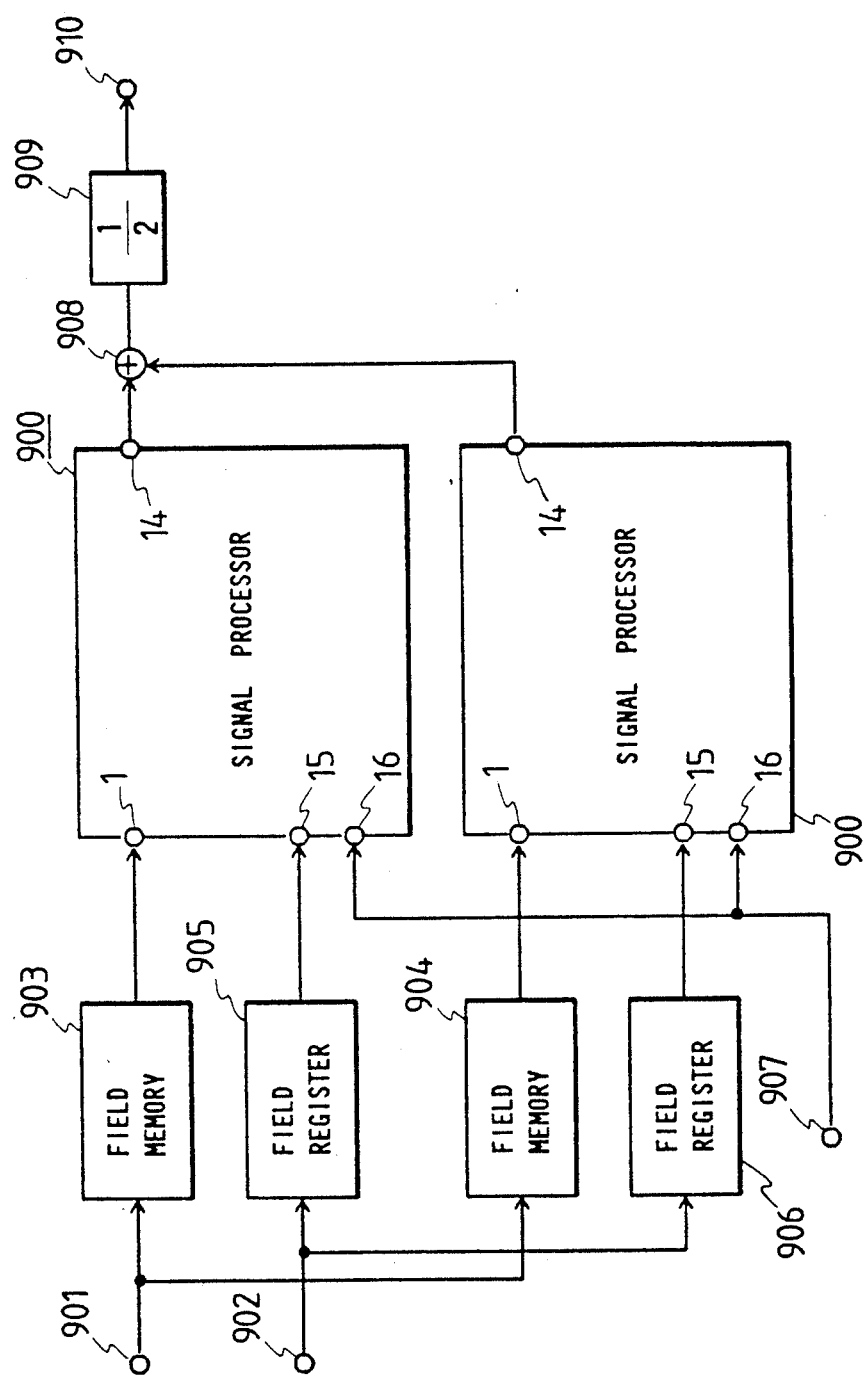
FIG. 9 is a block diagram of another embodiment of the invention.

FIG. 9 is a block diagram of another embodiment of the invention, and shows a signal processing circuit which outputs a frame static image with little deterioration of the picture quality utilizing the signal processing circuit of of the invention.

In FIG. 9, numeral 901 designates a video signal input terminal, numeral 902 designates a field information input terminal, numerals 903, 904 designate field memories, numeral 905 designates a register for storing the field information, numeral 907 designates a reference video input terminal, and numeral 900 designates a signal processing circuit in the same constitution as that of FIG. 1 and input terminals thereof are designated by the same reference numerals as that of FIG. 1 and have the same function. Also, numeral 908 designates an adder, numeral 909 designates a multiplier, and numeral 910 designates an output terminal.

Signals of two continuous fields inputted to the input terminal 901 are stored in sequence in the field memory 903 and the field memory 904.

On the other hand, the field numbers (I-IV) of these signals are also stored through the input terminal 902 to the registers 905, 906 respectively. The signal processing circuit 900 performs the above-mentioned signal processing in accordance with the video data and the field information as well as the reference video signal inputted to the input terminal 907, and outputs the field static image to the output terminal 14, respectively. The adder 908 and the multiplier 909 perform the averaging processing of these signals, and output the averaged output to the output terminal 910.

Since one sheet of the static image is composed from two fields of input images by the averaging in this manner, flicker is not produced in the motion portion and the picture quality can be improved.

The signal processing of the invention may be performed in blanking the horizontal flyback line and the vertical flyback line, and the synchronous signal may be provided after the signal processing so that damage due to the processing of the synchronous signal can be prevented.

The invention can be applied not only to the static picture output but also to the slow motion reproduction.

When the invention is applied particularly to the digital VTR, since an address is added to the video information, the above-mentioned operation can be performed accurately.

The field memory 903 can be used commonly with the memory used in the error correction circuit of the digital VTR.

What is claimed is:

1. A video signal processing circuit comprising:
   first and second digital video signal processing circuits each comprising:
   first means for extracting a first frequency component in a relatively low region from color composite video signals including luminance and chrominance components;
   second means for extracting a second frequency component with a chrominance component mainly distributed from the color composite signals;
   third means for extracting a chrominance component from the second frequency component;
   fourth means for extracting a luminance component from the second frequency component:
   chrominance control means having a control terminal and for outputting a chrominance component from the third means in phase conversion when a control signal supplied to the control terminal is at a first level and for outputting a chrominance signal from the third means without phase inversion when the control signal is at a second level;
   signal composite means for composing outputs of the first means, the fourth means and the chrominance control means; and
   input means for inputting video signals of at least continuous fields to the two digital video signal processing circuits, respectively; and output means for averaging and outputting outputs of the two digital video signal processing circuits.

2. A video signal processing circuit comprising:

first means for adaptively separating luminance and chrominance components from a color composite video signal, said color composite video signal having field information associated therewith;

second means for scan-line-interpolating the separated luminance components;

third means for scan-line-interpolating the separated chrominance components;

fourth means for combining output signals from said second and third means;

fifth means for detecting the field information of said color composite video signal;

sixth means for detecting field information of a color reference image to be output; and seventh means for controlling operations of said first, second and third means in response to the field information detected by said fifth and sixth means.

3. A video signal processing circuit comprising:

first means connected to receive a first video signal in two sequential fields;

second means for generating four video signals in four different fields from said first video signal in a first field of said two sequential fields;

third means for generating four video signals in four different fields from said first video signal in a second field of said two sequential fields; and combining means for combining output signals of said second and third means.

* * * * *